(12) United States Patent
Botsch

(10) Patent No.: US 6,365,040 B1
(45) Date of Patent: Apr. 2, 2002

(54) EQUIPMENT FOR THE RETARDATION OF AN INFLOW IN CIRCULAR SEDIMENTATION TANKS

(76) Inventor: Bertram Botsch, Indertasch 2C, Karlsruhe (DE), 76227

( * ) Notice: Subject to any disclaimer, the term of this patent is extended or adjusted under 35 U.S.C. 154(b) by 0 days.

(21) Appl. No.: 09/691,182

(22) Filed: Oct. 19, 2000

(30) Foreign Application Priority Data

Oct. 23, 1999 (DE) .......................... 199 50 733

(51) Int. Cl.[7] .............................................. B01D 21/06
(52) U.S. Cl. .................... 210/121; 210/242.1; 210/519; 210/541
(58) Field of Search ............................. 210/121, 242.1, 210/519, 528, 541

(56) References Cited

U.S. PATENT DOCUMENTS

| 2,651,615 A | * | 9/1953 | Kelly et al. ................. 210/528 |
| 3,140,529 A | * | 7/1964 | Kelly .......................... 210/528 |
| 3,486,628 A | * | 12/1969 | Darby ......................... 210/528 |
| 4,915,823 A | * | 4/1990 | Hall ............................ 210/519 |
| 5,104,528 A | * | 4/1992 | Christie .................... 210/242.1 |
| 5,384,033 A | * | 1/1995 | Matasovic ............... 210/242.1 |

FOREIGN PATENT DOCUMENTS

| DE | 29 33 057 C2 | 8/1980 |
| DE | 35 40 606 A1 | 5/1987 |
| DE | 195 43 462 A1 | 5/1996 |
| DE | 197 58 360 A1 | 7/1999 |

* cited by examiner

*Primary Examiner*—Christopher Upton
(74) *Attorney, Agent, or Firm*—Wenderoth, Lind & Ponack, L.L.P.

(57) ABSTRACT

Equipment to achieve retardation of inflow into circular or polygonal sedimentation tanks, final sedimentation tanks, and thickeners in sewage treatment plants is provided through the use of circular or polygonal self-supporting structures one or more arranged around the central inlet pipe and reaching into the liquid depths. Other improvements regard to preferable modes of the retardation center well and floats as well as to their arrangement to each other as well as to their location in the tank.

18 Claims, 2 Drawing Sheets

EQUIPMENT FOR THE RETARDATION OF AN INFLOW IN CIRCULAR SEDIMENTATION TANKS

BACKGROUND OF THE INVENTION

The invention relates to equipment for the retardation of an inflow in circular or polygonal sedimentation tanks, final sedimentation tanks, and thickeners in sewage treatment plants, including a cylindrical or polygonal self-supporting structure around the central inlet, reaching from the liquid surface down the liquid depth, embodied by a retardation center well and one or more floats.

The uniform distribution and retardation of the inflow inside a circular flow section near the inlet structure is the most essential condition for the undisturbed flow in circular or polygonal sedimentation tanks for the resulting separation of solids and liquid. The effect of the separation is a physical-hydraulical function of the liquid surface available, the "free surface". Therefore the surface of the tank or of the liquid should be as large as possible and should not be more restricted than necessitated by any structures, i. e. the above mentioned equipment. The equipment itself for the uniform distribution and retardation of the inflow must be large enough to comply with that other demand to produce the uniform flow. Demand for a large surface for uniform distribution is contradictory to demand for a large free surface in the tank for efficient sedimentation.

The German Patent Application DE 197 58 360 A1 describes a process and equipment for the separation of a mixture of clarified sewage and activated sludge. The inlet pipe is routed under the tank to its center with a vertical riser concentric to the tank wall. A cylindrical well is arranged in the upper region and concentric to the riser. The cylindrical well is provided with openings at different levels. Technical means allow to select the openings the most appropriated. The level of the inlet flow can be chosen by using different openings to achieve an optimized entrance of the mixture into the tank and penetrating the sludge layer. The level of the inlet flow can be adjusted depending on various parameters of the mixture and of hydraulic and other conditions in the operation. The use of different inlet elevations and flow volume are determined by water/sludge separation phases as well as the elevation of different concentration elevations in the tank. In this application the separation efficiency should be respected with the different flow rates and levels of the inlet opening only. The geometry of the inlet pipe and cylindrical well are similar to the modifications of the German Patent Applications DE 195 43 462 A1 and DE 35 40 606 A1. A sufficiently retarded inflow cannot be attained using the means shown in those applications.

There are innumerable other designs of inlet structures developed to get a solution for the above mentioned contradictory demand. These well known inlet structures do not sufficiently provide the desired calm and uniform flow.

SUMMARY OF THE INVENTION

The object of the invention refers to at least two steps:

My numerical simulations show efficiency can be achieved through larger and deeper structures of the inlet into the liquid. But such larger equipment can only be executed by a relatively great expenditure, which is unacceptable in most cases. Therefore the practical use of very large sizes of the equipment is impeded by geometry of location.

The object of the invention is to provide equipment to solve the large structure problem described above, to allow larger inlet structures also with conventional large tank sizes.

The objective of this invention is achieved by providing a cylindrical or polygonal self-supporting retardation center well around the central inlet reaching from the surface into the liquid and by providing one or more floats.

Another objective of this invention is achieved by providing the center well as a light weight structure and another objective is achieved by annular or polygonal floats.

Further advantage can be achieved and various structural designs are possible according to the features of the claims.

REMARKS TO OTHER REFERENCES CITED

The use of floats is very common in the engineering. The German Patent Application DE 35 40 606 A1 shows voluminous packages of lamellas inside of a tank carried by floats. Within the spaces below and above the packages large mechanical structures revolve, i.e. scraping arms and rotating bridges. Therefore the voluminous packages of lamellas can only be carried by floats. They are additionally fixed at the wall of the tank. This complete unit is very heavy and not at all a light weight structure.

On the other side floats are known in water engineering to fix, to hold or to guide equipment at or corresponding to the water level, i. e. a floating scumboard in front of an outlet of a tank, according to German Patent DE 29 33 057 C2.

BRIEF DESCRIPTION OF THE DRAWINGS

Embodiments of the invention will be explained with reference to the accompanying drawings, wherein.

DETAILED DESCRIPTION OF THE PREFERRED EMBODIMENT

Figure 1:
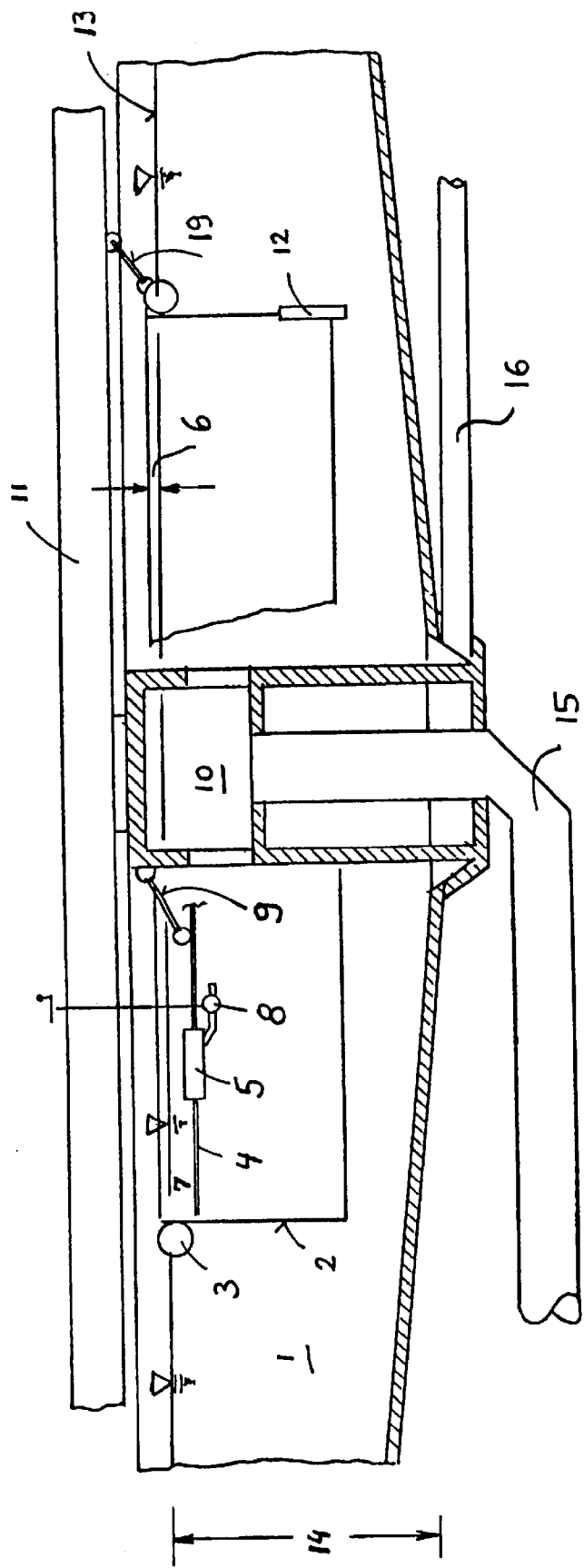
FIG. 1 shows a cross section through a sedimentation tank with the inlet structure, with the equipment according to the invention, with a part of the rotating bridge but without any scraping mechanism being illustrated in FIG. 1.
Figure 2:
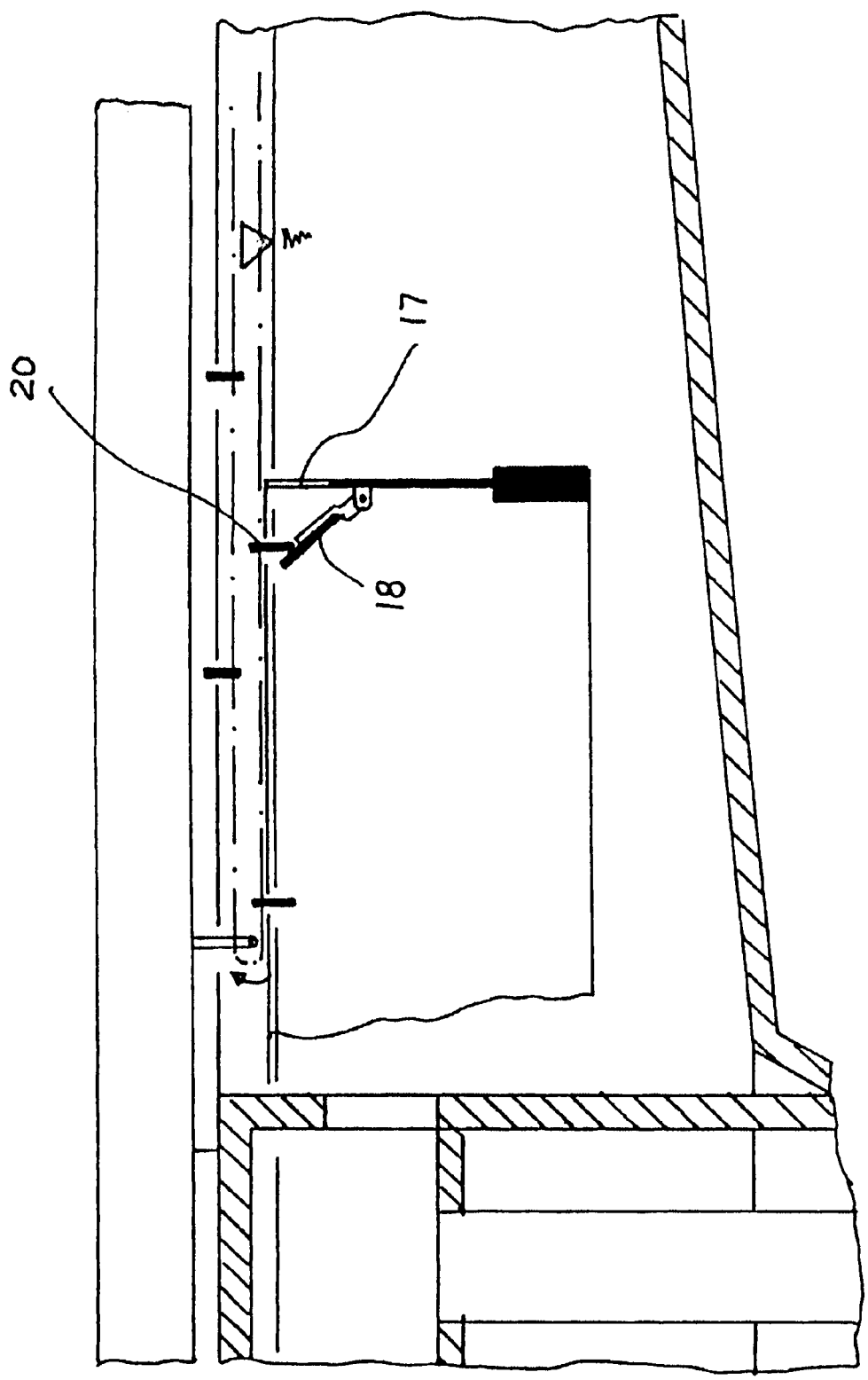
FIG. 2 shows the scraping mechanism penetrating through an opening that has a closable gate.

The inlet structure 10 is arranged in the center of the tank 1. The liquid flows from the inlet structure 10 into the tank 1. The effluent of the tank 1 itself is at the outer wall of the tank 1 and not shown in the drawing. More or less the tank can be regarded as a water volume consisting of two zones or sections: a turbulent inlet zone and a calm sedimentation zone, divided by/at the center well.

The liquid flows through the tank 1 in such a way that it comes from the inlet pipeline 15 to the inlet structure 10, hits the retardation center well 2, to be guided first down and then in a radial direction and finally through the space below the retardation center well 2 in the tank 1. The solids separate in direction to the bottom or at the bottom already inside of the retardation center well 2 and particularly at the following way of the flow. The sediment will be scraped into the central sludge collector by a non shown scraping device and drawn off through a sludge exit pipeline 16.

The retardation center well 2 is fixed at floats 3, so that the complete equipment is executed in a sophisticated and self-supporting light weight structure.

The retardation center well 2 can preferably consist of thin and light material because of the more or less equalized conditions of hydraulic pressure on both sides of the retardation center well 2. The very small pressure which is effected by the diversion of the flow inside at the retardation center well 2 creates a uniform radial swell of the retardation center well 2. Therefore no additional mechanical structure is necessary to avoid instability in radial direction.

To use a self-supporting structure of the retardation center well 2 allows the use of a material unusually thin and light like an extremely thin sheet metal or the use of other substances like plastic foil or reinforced plastics. The weight of the so built structure is tremendously reduced which generally effects the costs as well as the applicability so far. These materials preferably can be executed as sewage resisting material and the sheet metal, i.e., as sewage resisting aluminum or stainless steel. According to the invention of the consequential light weight structure the weight reduction is twofold: using thin profiles effect small weights of the construction and small weights effect again small profiles.

For the fixation of the complete equipment connecting elements 9, 19 are advantageous either as elements 9 fixed at the inlet structure 10 to hold the equipment stationary or as elements 19 fixed at the bridge 11 to let revolve the equipment with the bridge 11. Because of the small weight of the complete equipment the design of these connecting elements follows advantageously the rules of light weight structures and are executed in very thin and economic profiles or ropes.

To stabilize the complete equipment in its upper region various designs are used. The float 3 can be designed annular or starlike or can be executed partially of a frame work 4 annular or polygonal, starlike or similar. In these modifications the float 3 consists of hollow profiles 5 to realize the frame work 4 partially or completely. For operation purposes it is advantageous to complete the floats 3 or hollow profiles 5 with flood gates 8.

In a particularly advantageous example the float 3 consists of an elastic inflatable tube in one or more parts at which the retardation center well 2 is fixed. The greatest benefit concerns the effect that an annular elastic tubing automatically forms the approximate annular circle during the blowing. Radial fixation elements as the cited frame work can be omitted more or less.

Additionally it is advantageous to extend a small portion 6 of the retardation center well 2 upwards over the float 3 respective over the liquid surface 13.

In final sedimentation tanks or thickeners of sewage treatment plants you have to account scum at the liquid surface 13 inside of the so called zone of scum 7. The zone of scum is the upper section of the water volume. It is advantageous to arrange the floats 3 and 5 below the zone of scum 7. Then there is enough space for the accumulation of the scum and its conveying out. To arrange properly a mechanism 20 for the conveying of scum it is advantageous to apply closable openings 17 (with closable gates 18) for the penetration of that mechanism. Because the opening can be closed after using the retardation center well 2 separates the turbulent inlet zone and quiet sedimentation zone outside of the retardation center well 2 as requested.

To complete the desired light weight structure it is advantageous to fix weights 12 at the lower part of the retardation center well 2 or below it to stabilize the retardation center well 2 vertically.

As above described the numerical simulation of flows explains some dependences between the structures inside the tank and the pattern of the flow. 1 now could show in variations of geometrical values of the tanks the positive effect of large as well as deep retardation center well 2 however larger and deeper ones as usual. There is no detailed knowledge about that dependences. And additionally the use of such large structures does not seem applicable due to the large weight of large structures in large tanks.

In accordance with the invention the light weight structure of the equipment allows in a very simple manner to realize the large size of the equipment at all and e. g. to extend the retardation center well 2 very far down into the depth of the tank 1 at least to a depth more than the half of the waterdepth at the inlet structure as well as to extend the diameter of the retardation center well 2 to a size of ⅕ to ⅛ of the diameter of the tank 1 also at very large tanks 1. Therefore the effect of the inventions occurs mostly with tanks of 40 to 70 meter diameter, which are very common.

Many existing plants must be optimized or improved because insufficient results are caused by insufficient guidance and irregular pattern of the flow in the sedimentation tanks. With conventional means it is difficult or impossible to apply appropriate large structures in the tanks later on due to their large weight. The weight of the large structures needed generally could not be borne by the existing structures of buildings or equipment.

The invention is characterized by the mentioned self-supporting light weight structure and this at large size. The invention solves one of the general problems in the use of large tanks. The equipment according to the invention can be applied in new buildings as well in existing ones.

I claim:

1. An inflow retardation apparatus for use with a circular or polygonal tank having an inlet structure, said inflow retardation apparatus comprising:

a self supporting structure including a circular or polygonal retardation center well to be placed around the inlet structure of the tank, and one or more floats arranged on said retardation center well, said self supporting structure having a diameter of ⅛ to ⅕ of the diameter of the tank.

2. An inflow retardation apparatus according to claim 1, further comprising:

a framework having an annular or starlike shape, wherein said retardation center well is fixed to said framework, and said framework is borne by framework floats.

3. An inflow retardation apparatus according to claim 2, further comprising:

connecting elements for connecting said inflow retardation apparatus to the inlet structure of the tank.

4. An inflow retardation apparatus according to claim 2, for further use with a bridge, said inflow retardation apparatus further comprising:

connecting elements for connecting said inflow retardation apparatus to the bridge.

5. An inflow retardation apparatus according to claim 1, wherein said retardation center well is made at least partially of at least one of plastic sheet material, aluminum foil, and stainless steel.

6. An inflow retardation apparatus according to claim 5, further comprising:

weights arranged at a lower part of said retardation center well or below said retardation center well.

7. An inflow retardation apparatus according to claim 6, wherein the tank holds liquid and said retardation center well extends upward over said one or more floats and/or over a surface of the liquid in the tank.

8. An inflow retardation apparatus according to claim 7, wherein said retardation center well extends down into the tank more than half of a depth of the liquid in the tank at the inlet structure.

9. An inflow retardation apparatus according to claim 8, for further use with a mechanical scum scraping device, wherein said retardation center well and/or said floats have at least one opening with a closable gate to allow penetration by the mechanical scum scraping device.

10. An inflow retardation apparatus for use with a circular or polygonal tank having an inlet structure, said inflow retardation apparatus comprising:

a self supporting structure including a circular or polygonal retardation center well to be placed around the inlet structure of the tank, and one or more floats arranged on said retardation center well, said self supporting structure having a diameter of $1/8$ to $1/3$ of the diameter of the tank;

wherein at least one of said floats is an annular or polygonal float.

11. An inflow retardation apparatus according to claim 10, further comprising:

a framework having an annular or starlike shape, wherein said retardation center well is fixed to said framework, and said framework is borne by framework floats.

12. An inflow retardation apparatus according to claim 11, wherein at least one of said floats has a hollow profile arranged approximately radially inside said retardation center well.

13. An inflow retardation apparatus according to claim 12, wherein said floats are arranged below a zone of scum.

14. An inflow retardation apparatus according to claim 13, wherein at least one of said floats comprises a flood gate.

15. An inflow retardation apparatus according to claim 14, wherein at least one of said floats comprises an elastic inflatable tube in one or more parts.

16. An inflow retardation apparatus according to claim 10, wherein said retardation center well is made at least partially of at least one of plastic sheet material, aluminum foil, and stainless steel.

17. An inflow retardation apparatus according to claim 16, further comprising:

weights arranged at a lower part of said retardation center well or below said retardation center well.

18. An inflow retardation apparatus according to claim 17, wherein the tank holds liquid and said retardation center well extends down into the tank more than half of a depth of the liquid in the tank at the inlet structure.

* * * * *